(12) United States Patent
Sorenson et al.

(10) Patent No.: US 7,845,344 B2
(45) Date of Patent: Dec. 7, 2010

(54) INCLUSIVE SINGLE-USE HEATING DEVICE

(75) Inventors: Chad M. Sorenson, Oregon, WI (US);
David C. Franchino, Madison, WI (US);
Mark Schweiger, Madison, WI (US);
Tom Bush, Madison, WI (US)

(73) Assignee: Sologear, LLC, Madison, WI (US)

( * ) Notice: Subject to any disclaimer, the term of this patent is extended or adjusted under 35 U.S.C. 154(b) by 0 days.

(21) Appl. No.: 12/038,362

(22) Filed: Feb. 27, 2008

(65) Prior Publication Data

US 2008/0202489 A1     Aug. 28, 2008

Related U.S. Application Data

(60) Provisional application No. 60/891,848, filed on Feb. 27, 2007.

(51) Int. Cl.
*A47G 23/04*     (2006.01)

(52) U.S. Cl. .................. 126/246; 126/43; 126/262; 431/331; 431/341

(58) Field of Classification Search ............. 126/246, 126/43, 262; 431/331, 341
See application file for complete search history.

(56) References Cited

U.S. PATENT DOCUMENTS

| | | | | | |
|---|---|---|---|---|---|
| 790,612 | A | * | 5/1905 | Boniface | 126/246 |
| 1,104,383 | A | * | 7/1914 | Potter | 431/341 |
| 1,226,625 | A | * | 5/1917 | Ball | 431/331 |
| 1,542,852 | A | * | 6/1925 | Busch | 126/43 |
| 1,995,049 | A | * | 3/1935 | Zeitz | 431/342 |
| 2,034,478 | A | * | 3/1936 | Levy | 62/457.6 |
| 2,036,739 | A | * | 4/1936 | Arnold | 222/459 |
| 2,302,984 | A | | 11/1942 | Tollzien | |
| 2,334,847 | A | | 11/1943 | Spiers | |
| 2,562,647 | A | * | 7/1951 | Shaver | 222/480 |
| 2,619,951 | A | | 12/1952 | Kahn | |
| 2,669,914 | A | | 2/1954 | Swaine | |
| 2,673,003 | A | | 3/1954 | Stewart | |
| 2,673,806 | A | | 3/1954 | Colman | |
| 2,733,709 | A | * | 2/1956 | Sukacev | 126/262 |
| 2,746,378 | A | | 5/1956 | Lang | |
| 2,772,627 | A | | 12/1956 | Newell | |
| 2,834,661 | A | | 5/1958 | Chaplin | |
| 2,842,116 | A | | 7/1958 | Hinderer | |
| 2,875,683 | A | | 3/1959 | Burns | |

(Continued)

FOREIGN PATENT DOCUMENTS

WO     WO 2006/107983     10/2006

(Continued)

OTHER PUBLICATIONS

United States Office Action for U.S. Appl. No. 11/398,579 dated May 30, 2008 (9 pages).

(Continued)

*Primary Examiner*—Kenneth B Rinehart
*Assistant Examiner*—Jorge Pereiro
(74) *Attorney, Agent, or Firm*—Michael Best & Friedrich LLP

(57) ABSTRACT

The invention comprises a fuel package comprising a vessel, a fuel, a combustion-restricting choke plate and a sealed lidding.

16 Claims, 14 Drawing Sheets

U.S. PATENT DOCUMENTS

| | | | |
|---|---|---|---|
| 2,918,051 A | 12/1959 | Broman | |
| 2,965,096 A | 12/1960 | Barton | |
| 2,965,097 A | 12/1960 | Clark, Jr. | |
| 2,975,887 A * | 3/1961 | Weingart | 206/533 |
| 2,981,249 A | 4/1961 | Russel | |
| 3,000,372 A | 9/1961 | Hall | |
| 3,094,981 A * | 6/1963 | Brewer | 126/263.05 |
| 3,109,420 A | 11/1963 | Ott et al. | |
| 3,146,773 A | 9/1964 | Melzer | |
| 3,157,315 A * | 11/1964 | Bianco | 222/142.5 |
| 3,183,068 A | 5/1965 | Alexander | |
| 3,262,445 A | 7/1966 | Stults et al. | |
| 3,279,453 A | 10/1966 | Norehad et al. | |
| 3,291,579 A * | 12/1966 | Mulasky | 44/266 |
| 3,292,608 A | 12/1966 | Waddell et al. | |
| 3,353,527 A | 11/1967 | Anderson | |
| 3,370,582 A | 2/1968 | Rauh | |
| 3,371,659 A | 3/1968 | Paspalas | |
| 3,385,282 A | 5/1968 | Lloyd | |
| 3,394,693 A | 7/1968 | Robinson | |
| 3,407,803 A | 10/1968 | Cervenak | |
| 3,428,039 A | 2/1969 | Desmoulins | |
| 3,478,733 A | 11/1969 | Meyerhoefer | |
| 3,491,743 A | 1/1970 | Temp | |
| 3,509,814 A | 5/1970 | Karapetian | |
| 3,555,994 A | 1/1971 | Nemetz | |
| 3,570,469 A | 3/1971 | Jones | |
| 3,575,156 A | 4/1971 | Hosford | |
| 3,583,309 A | 6/1971 | Freidenrich | |
| 3,589,353 A | 6/1971 | Sanders | |
| 3,606,609 A | 9/1971 | Lipper et al. | |
| 3,682,154 A | 8/1972 | Mollere | |
| 3,684,087 A | 8/1972 | Anderson | |
| 3,769,957 A | 11/1973 | Ozaki | |
| 3,774,560 A * | 11/1973 | Hartz | 413/6 |
| 3,841,298 A | 10/1974 | Sellors | |
| 3,910,250 A | 10/1975 | Orsing | |
| 3,913,557 A * | 10/1975 | Ewanika et al. | 126/43 |
| 3,978,782 A | 9/1976 | Werling | |
| 4,100,912 A | 7/1978 | Doane | |
| 4,140,099 A | 2/1979 | Newport | |
| 4,150,610 A | 4/1979 | Ferrara | |
| 4,254,863 A | 3/1981 | Katcs et al. | |
| 4,351,314 A | 9/1982 | Morton | |
| 4,394,342 A * | 7/1983 | Mercer | 264/292 |
| 4,436,525 A | 3/1984 | Zmoda et al. | |
| 4,487,572 A | 12/1984 | Parker | |
| 4,503,835 A | 3/1985 | Williams | |
| 4,526,158 A | 7/1985 | Lee | |
| 4,530,343 A | 7/1985 | Beck | |
| 4,531,506 A | 7/1985 | Chambers | |
| 4,559,921 A | 12/1985 | Benmussa | |
| 4,621,608 A | 11/1986 | Lee | |
| 4,692,168 A | 9/1987 | Dotson et al. | |
| 4,708,122 A * | 11/1987 | Rock | 126/43 |
| 4,762,525 A | 8/1988 | Wood | |
| 4,771,761 A * | 9/1988 | Doukhan et al. | 126/263.09 |
| 4,782,812 A | 11/1988 | Kellerman | |
| 4,786,290 A | 11/1988 | Wyer | |
| 4,793,320 A | 12/1988 | Bakic | |
| 4,877,010 A | 10/1989 | Hait | |
| 4,885,989 A | 12/1989 | Korpan | |
| 4,896,653 A * | 1/1990 | Eke et al. | 126/45 |
| 4,899,721 A | 2/1990 | Tsay | |
| 4,908,044 A * | 3/1990 | Brungardt | 44/266 |
| 4,913,126 A | 4/1990 | McCall | |
| 4,938,202 A | 7/1990 | Hait | |
| 4,953,533 A | 9/1990 | Witt | |
| 4,958,618 A | 9/1990 | Davidson | |
| 4,969,449 A | 11/1990 | Levin | |
| 5,024,208 A | 6/1991 | Hottenroth et al. | |
| 5,054,265 A * | 10/1991 | Perigo et al. | 53/425 |
| 5,054,642 A * | 10/1991 | Yoshida | 220/276 |
| D323,096 S | 1/1992 | Pack | |
| 5,143,045 A | 9/1992 | Minnis | |
| 5,143,046 A | 9/1992 | Koziol | |
| 5,147,591 A * | 9/1992 | Yoshida | 264/163 |
| 5,184,421 A * | 2/1993 | Meharg | 47/65.5 |
| 5,193,521 A | 3/1993 | Levinson et al. | |
| 5,211,105 A | 5/1993 | Liu | |
| 5,257,616 A | 11/1993 | Koziol | |
| 5,261,386 A | 11/1993 | Burkhart | |
| 5,302,114 A | 4/1994 | Kiefer et al. | |
| 5,328,045 A * | 7/1994 | Yoshida | 220/359.2 |
| 5,359,988 A | 11/1994 | Hait | |
| 5,395,005 A * | 3/1995 | Yoshida | 220/359.2 |
| 5,405,262 A | 4/1995 | Appel | |
| 5,453,574 A | 9/1995 | Zuran et al. | |
| D363,191 S | 10/1995 | Gibson | |
| 5,467,697 A | 11/1995 | Hunziker | |
| 5,469,835 A | 11/1995 | Stephen et al. | |
| 5,495,845 A | 3/1996 | Hait | |
| 5,503,138 A | 4/1996 | Chang | |
| 5,535,666 A | 7/1996 | Southerland | |
| 5,535,733 A | 7/1996 | Hait | |
| 5,584,283 A | 12/1996 | Messina | |
| 5,638,743 A | 6/1997 | Lo | |
| 5,641,890 A | 6/1997 | Wesley | |
| 5,711,210 A | 1/1998 | Kaufman | |
| 5,785,045 A | 7/1998 | Chen | |
| 5,819,640 A | 10/1998 | Cuomo et al. | |
| 5,832,915 A | 11/1998 | Skidmore et al. | |
| 6,024,081 A | 2/2000 | Libertini, Jr. | |
| 6,076,515 A | 6/2000 | Smith | |
| 6,101,931 A | 8/2000 | Miklos | |
| 6,158,425 A | 12/2000 | Kim | |
| 6,205,912 B1 | 3/2001 | Chiu | |
| 6,591,828 B1 | 7/2003 | Schneider | |
| 6,606,987 B2 | 8/2003 | DeMars | |
| 6,644,298 B2 | 11/2003 | Hermansen et al. | |
| 6,755,877 B2 | 6/2004 | Perlman | |
| D548,086 S * | 8/2007 | Conway et al. | D9/732 |
| 7,438,204 B2 * | 10/2008 | Conway et al. | 222/486 |
| D592,445 S | 5/2009 | Sorenson et al. | |
| 2003/0087212 A1 | 5/2003 | Perlman | |
| 2005/0220832 A1 * | 10/2005 | Walton | 424/401 |
| 2006/0219233 A1 | 10/2006 | Sorenson et al. | |
| 2006/0260598 A1 | 11/2006 | Bjork et al. | |
| 2008/0202489 A1 | 8/2008 | Sorenson et al. | |

FOREIGN PATENT DOCUMENTS

WO    WO 2008/106502     9/2008

OTHER PUBLICATIONS

International Search Report and Written Opinion for Application No. PCT/US2006/12525 dated Jun. 19, 2008 (6 pages).

International Search Report and Written Opinion for Application No. PCT/US08/55107 dated Aug. 5, 2008 (7 pages).

United States Office Action for U.S. Appl. No. 11/398,579 dated Nov. 25, 2008 (15 pages).

* cited by examiner

INCLUSIVE SINGLE-USE HEATING DEVICE

CROSS REFERENCE TO RELATED APPLICATIONS

This application claims the benefit of priority to U.S. Provisional Patent Application No. 60/891,848 filed Feb. 27, 2007. This application is incorporated herein by reference in its entirety.

BACKGROUND OF THE INVENTION

Charcoal grills became popular after World War II and became synonymous with the "backyard barbeque" in America. In the United States alone, it is estimated that nearly $800 million of charcoal was sold in 2006. Despite its popularity and pervasiveness, little innovation has taken place in this industry and all of the same problems associated with charcoal still remain.

Despite the broad appeal of charcoal grilling, grilling with charcoal fuel presents a number of problems including: requiring some type of intermediate ignition means, typically lighter fluid (petroleum distillates); requiring a long warm-up time (typically 30 minutes) prior to being suitable to cook over; having a long cool-down time (typically at least four hours) before the combustion has fully ceased and the grill can be safely cleaned or stored; being extremely messy, both from a set-up and clean-up standpoint, due to dirty combination of ash, soot, grease and other remains; generating significant amounts of carbon monoxide (a widely-known inhalation toxin); producing smoke and emissions that are an air quality and environmental concern; burning dirty and producing more polycyclic aromatic hydrocarbons (known carcinogens) relative to electric or gas grilling alternatives; being heavy and taking up a significant amount of space.

The present invention is new heat source for barbeque grills and other applications; specifically those grills that are fueled with traditional charcoal briquettes.

SUMMARY OF THE INVENTION

The present invention is a new heating device intended for charcoal grills that is a direct substitute for traditional charcoal. In one embodiment the device comprises a vessel, a fuel, and a combustion-restricting choke plate. In certain embodiments the heat source device also includes a hermetically sealed lidding.

In one embodiment, the vessel of the heating device has a bottom and a side wall, the bottom and side wall of the vessel forming an interior of the vessel. In one embodiment, the diameter of the bottom and the height of the side wall has a ratio of at least 8:1. The fuel of the heating device is placed in the interior of the vessel. In another embodiment, the vessel further has a support ledge that extends from the top of the side wall. In yet another embodiment, the vessel contains a vessel curl flange that extends upward from the outer edge of the support ledge.

The choke plate of the heating device of the invention has a top side, a bottom side, an outer edge and a plurality of apertures. In one embodiment, the plurality of apertures are arranged in concentric rings around the choke plate. In a further embodiment, the plurality of apertures comprise three separate concentric rings around the choke plate, consisting of an inner, a middle, and an outer ring, with the diameter of the apertures in the inner ring being smaller than the diameter of the apertures in the middle ring, and the diameter of the apertures in the middle ring being smaller than the diameter of the apertures in the outer ring. In one embodiment of the invention the choke plate further has a depression section which has a bottom which is positioned lower than the bottom side of the choke plate. In one embodiment the depression section has a center section and a plurality of arm sections which extend towards the outer edge of the choke plate. In another embodiment the choke plate further contains a choke plate curl flange which extends upward from the outer edge of the choke plate. In this embodiment, a portion of the bottom side of the choke plate rests on the support ledge of the vessel and the vessel curl flange and the choke plate curl flange are curled together securing the choke plate to the vessel.

In certain embodiments the heat source device further comprises a lidding film having a top side and a bottom side. A portion of the bottom side of the lidding film is sealed to the top side of the choke plate.

In one embodiment the device can be used as follows: the user sets up his or her grill as usual and removes the lidding from the device to expose the choke-restricted fuel. The device is then placed in the grill instead of charcoal and the user ignites one of the exposed combustion apertures. Upon installing the grill's cooking grate, cooking can commence immediately.

Figure 1:
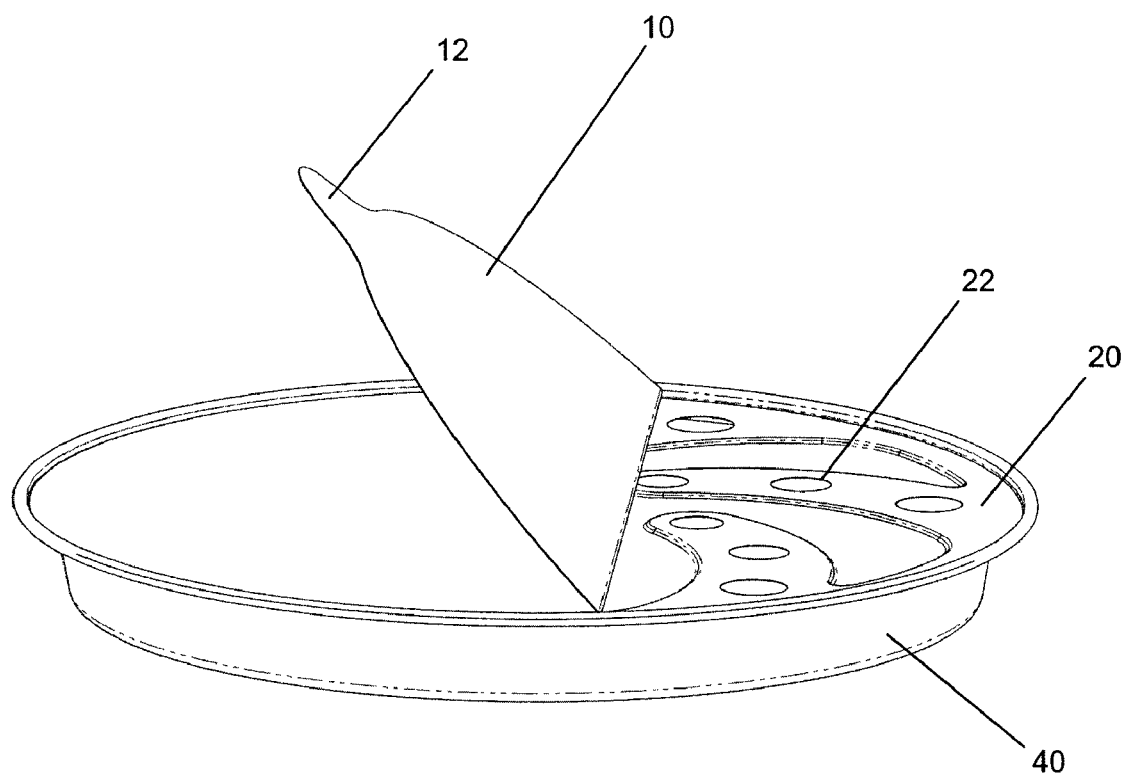
FIG. 1 is an assembled isometric view of the invention, showing the lidding 10 being removed.
Figure 2:
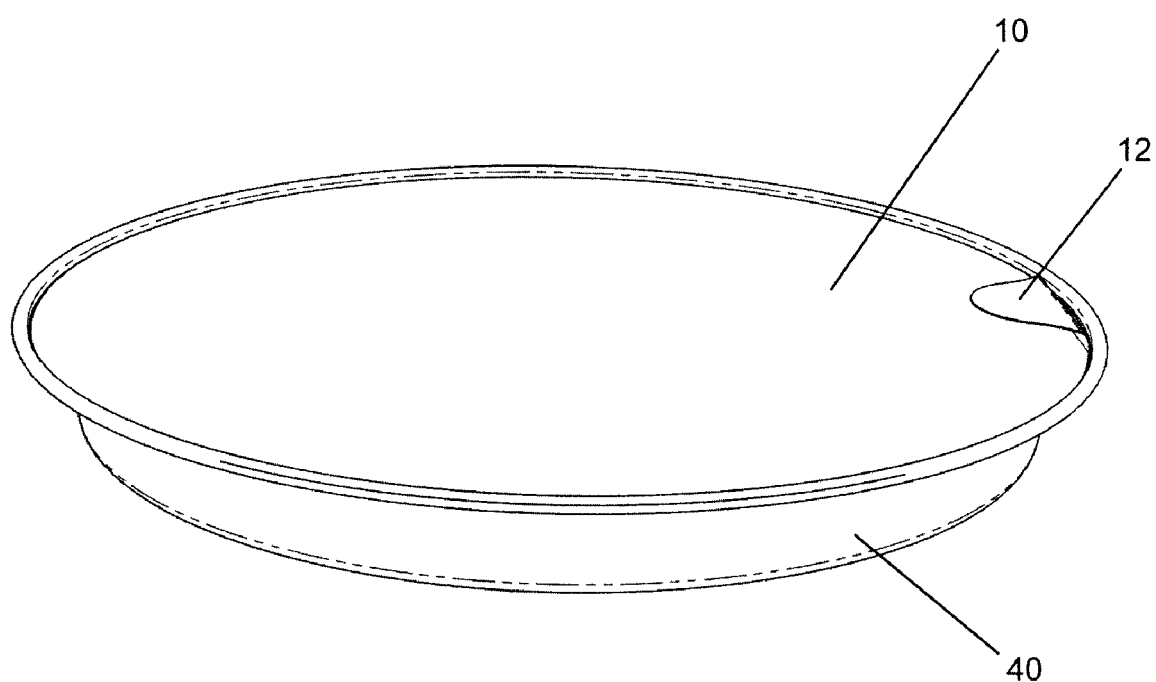
FIG. 2 is an assembled isometric view of the invention, showing the lidding 10 still in place as it would be during shipping and storage.
Figure 3:
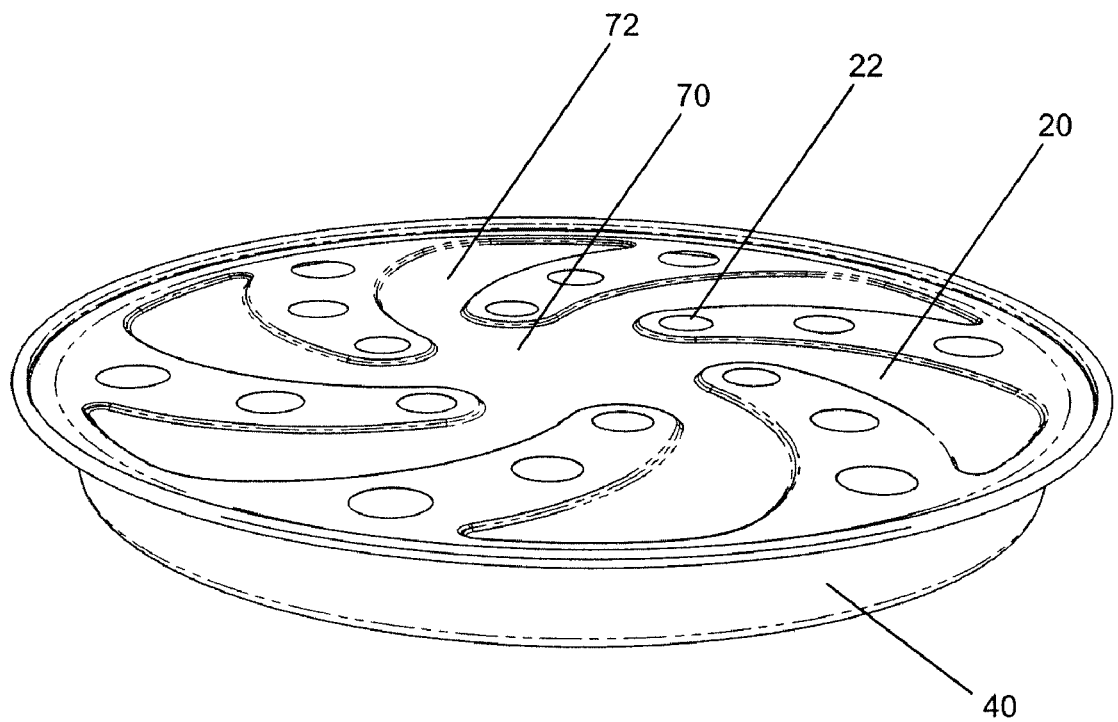
FIG. 3 is an assembled isometric view of the invention, showing the lidding 10 fully removed and ready for use.
Figure 4:
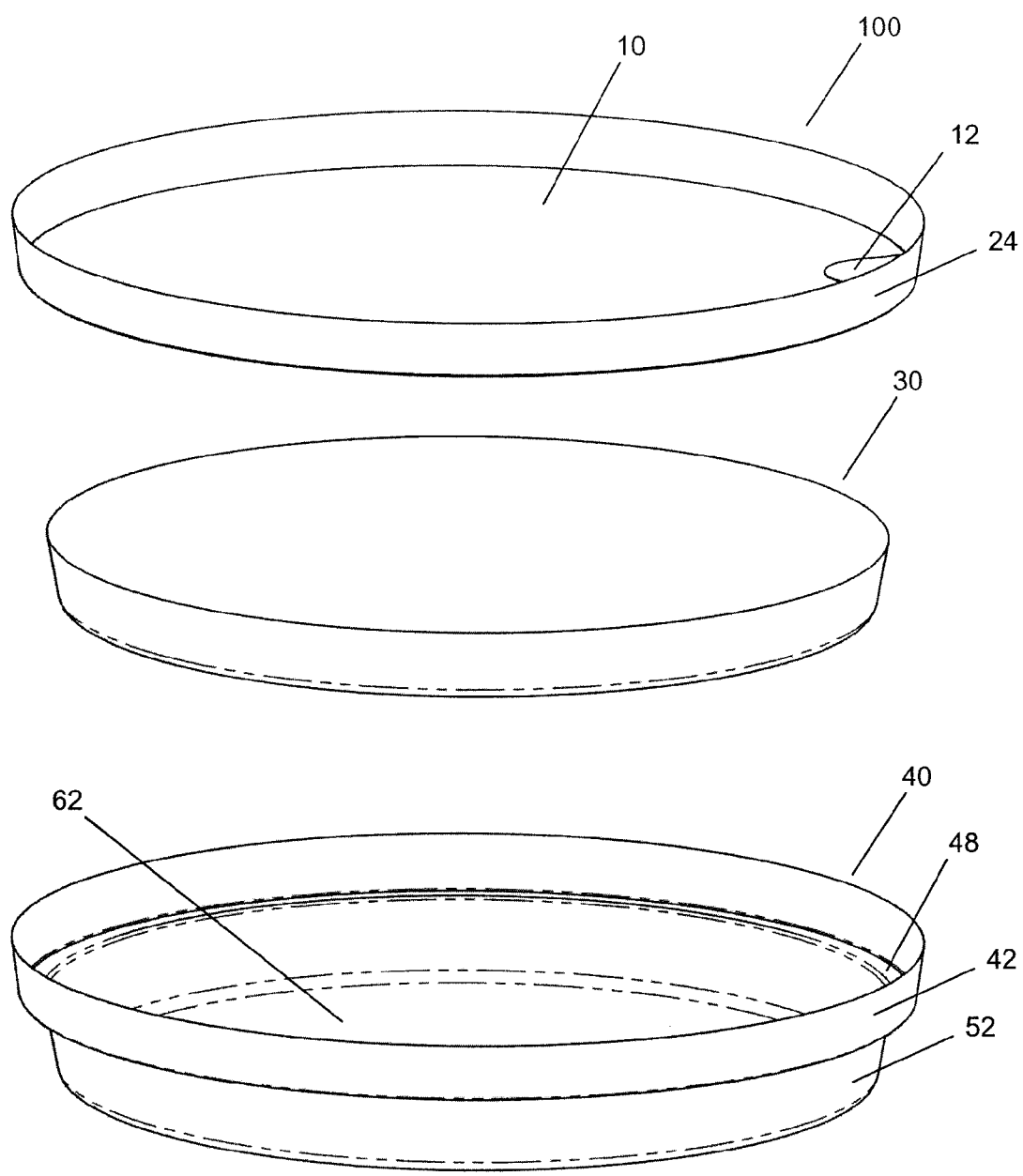
FIG. 4 is an exploded isometric view of the invention showing both the choke 20 and the vessel 40 in their pre-assembled, uncurled state.
Figure 5:
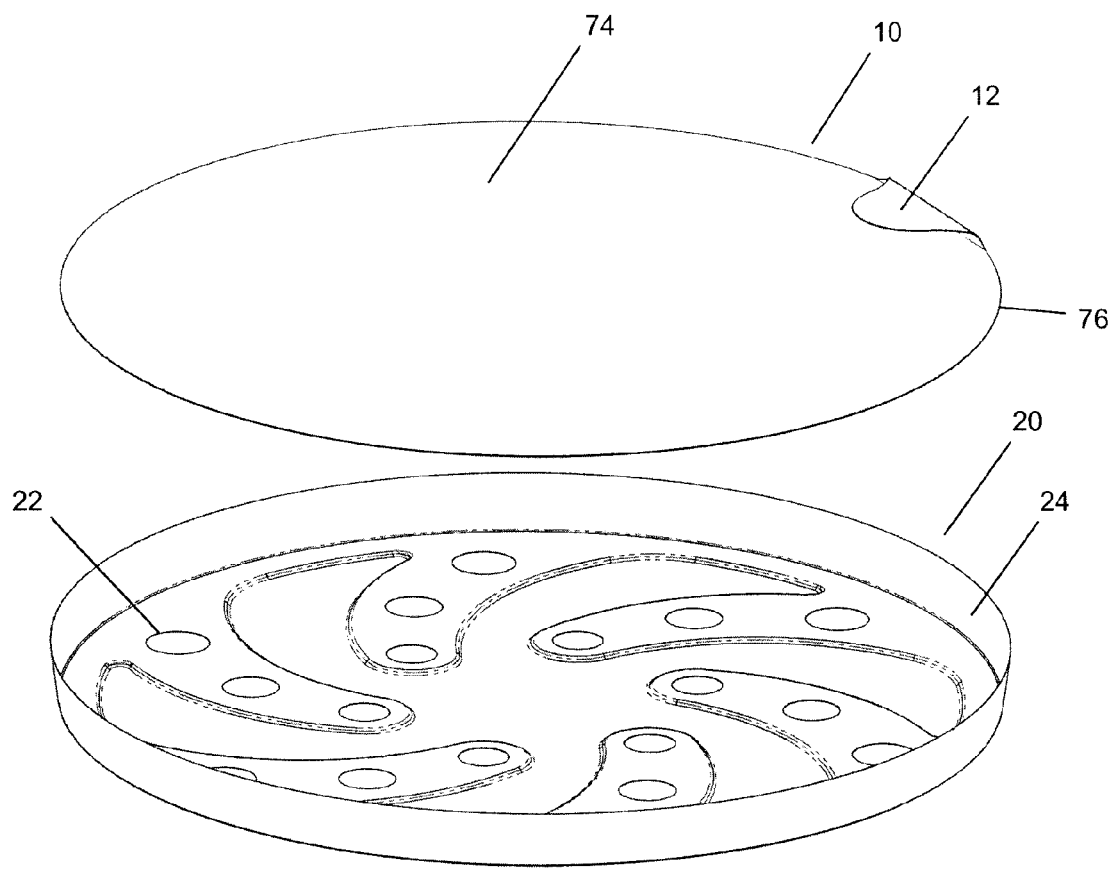
FIG. 5 is an exploded isometric view of the choke lidding subassembly 100.
Figure 6A:
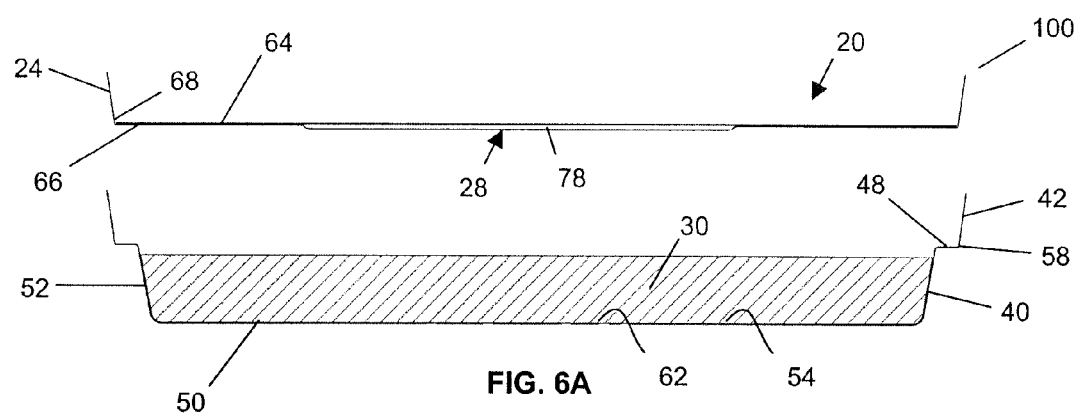
FIG. 6A is a cross-sectional exploded side view of the invention prior to curling the choke lidding subassembly 100 to the vessel 40.
Figure 6B:
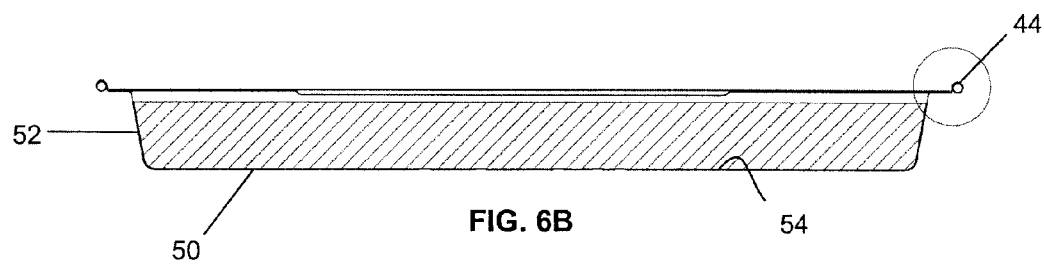
FIG. 6B is a cross-sectional assembled side view of the invention fully assembled and the formation of the curl 44.
Figure 6C:
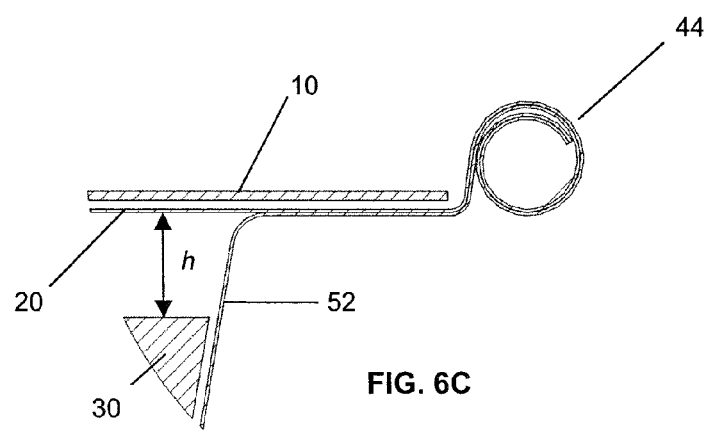
FIG. 6C is a detailed view of the cross-section of the invention showing the curl 44 formed between the choke lidding subassembly 100 and the vessel 40.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including", "having" and "comprising" and variations thereof herein is meant to encompass the items listed thereafter and equivalents thereof as well as additional items and equivalents thereof.

It also is understood that any numerical value recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between the lowest value and the highest value enumerated are to be considered to be expressly stated in this application.

DETAILED DESCRIPTION OF THE INVENTION

The present invention provides a single-use heating device that utilizes a non-charcoal fuel source that is pre-assembled and ready to use. The heating device is intended to be used within an existing grill and serves as a direct replacement for charcoal in charcoal grills. Alternatively, it can also be used within propane grills as a substitute for propane. This mode of use is particularly useful as a back-up fuel source when the propane inadvertently runs empty and no additional propane is conveniently available. The heating device can be used for a wide variety of applications beyond grilling as well, including boiling water or providing a heat source for a shore lunch, to name a couple. Suitably, the heating device requires no additional components beyond food and some means for food support, most often a standard charcoal grill, for a complete cooking session. Suitably, the fuel utilized is a solid alcohol, which is clean-burning, inexpensive and does not require the use of intermediate tinder material to achieve self-sustaining combustion. In this way, the user may directly ignite the base fuel and does not have to wait for the heat source to reach a suitable temperature to begin cooking, which is otherwise typical with more traditional wood or charcoal fuels. This allows the user to experience very little delay between ignition and actual cooking.

One embodiment of the invention is shown in FIGS. 1-9. In this embodiment the device is comprised of four main components: a vessel 40, fuel 30, a choke plate 20 and lidding film 10.

Suitably, the vessel 40 is fabricated from a thin sheet of metal. In one embodiment the thickness can be 0.004 in. thick aluminum. The vessel 40 contains comprises a bottom 50 and side wall 52 extending up from and surrounding the bottom 50 of the vessel 40. The bottom 50 and side wall 52 of the vessel 40 form the interior 62 of the vessel 40. The vessel 40 also has a top 54 off of which a support ledge 28 extends from. The support ledge 48 has an outer ledge 58 and is designed to support a portion of the choke plate 20. The vessel 40 also has a vessel curl flange 42 which extends upward from the outer edge 58 of the support ledge 48.

The fuel 30 is placed in the interior 62 of the vessel 40. The fuel 30 provides the heat content of the device through combustion and can be any clean burning volatile fuel, such as a solidified alcohol. In one embodiment the fuel comprises a solidified ethanol, water and sodium stearate mixture. Suitably ethanol is at least 55% w/v of the mixture. More suitably ethanol is present in an amount of between 80-95% w/v of the mixture. Water is suitably present in the mixture in an amount of 0-40% w/v, more suitably in an amount of 3-14% w/v, and even more suitably in an amount of 3-4% w/v. Sodium stearate is suitably present in the mixture in an amount of 2-20% w/v. More suitably, sodium stearate is present in an amount between 2-10% w/v of the mixture. In one embodiment the fuel mixture comprises a mixture of 90% ethanol, 7% sodium state and 3% water. The ratios of these components can be varied to achieve different performance attributes. For instance, reducing the amount of sodium stearate in the formula correspondingly reduces the amount of post-combustion residue that remains in the device.

Alternatively, the fuel 30 can utilize a polymer rheology modifier, such as Carbopol (available from Noveon, Inc), to increase the viscosity of the ethanol and water solution to a suitable viscosity. These processes are well known in the prior art for thickening alcohol-based fuel, such as U.S. Pat. No. 5,641,890, incorporated herein by reference.

Alternatively, the fuel 30 can also utilize nitrocellulose to achieve a gelled state. U.S. Pat. No. 3,183,068, incorporated herein by reference, describes how nitrocellulose can be used to gel alcohol. The alcohol does not need to be heated for this process.

The fuel 30 can also be any of the lower-carbon alcohols, such as methyl alcohol (methanol), ethyl alcohol (ethanol) or isopropyl alcohol (isopropanol). Ethanol has the advantage of being less toxic than methanol or isopropanol from an ingestion standpoint, but all burn extremely clean and are completely safe to cook over.

Figure 7:
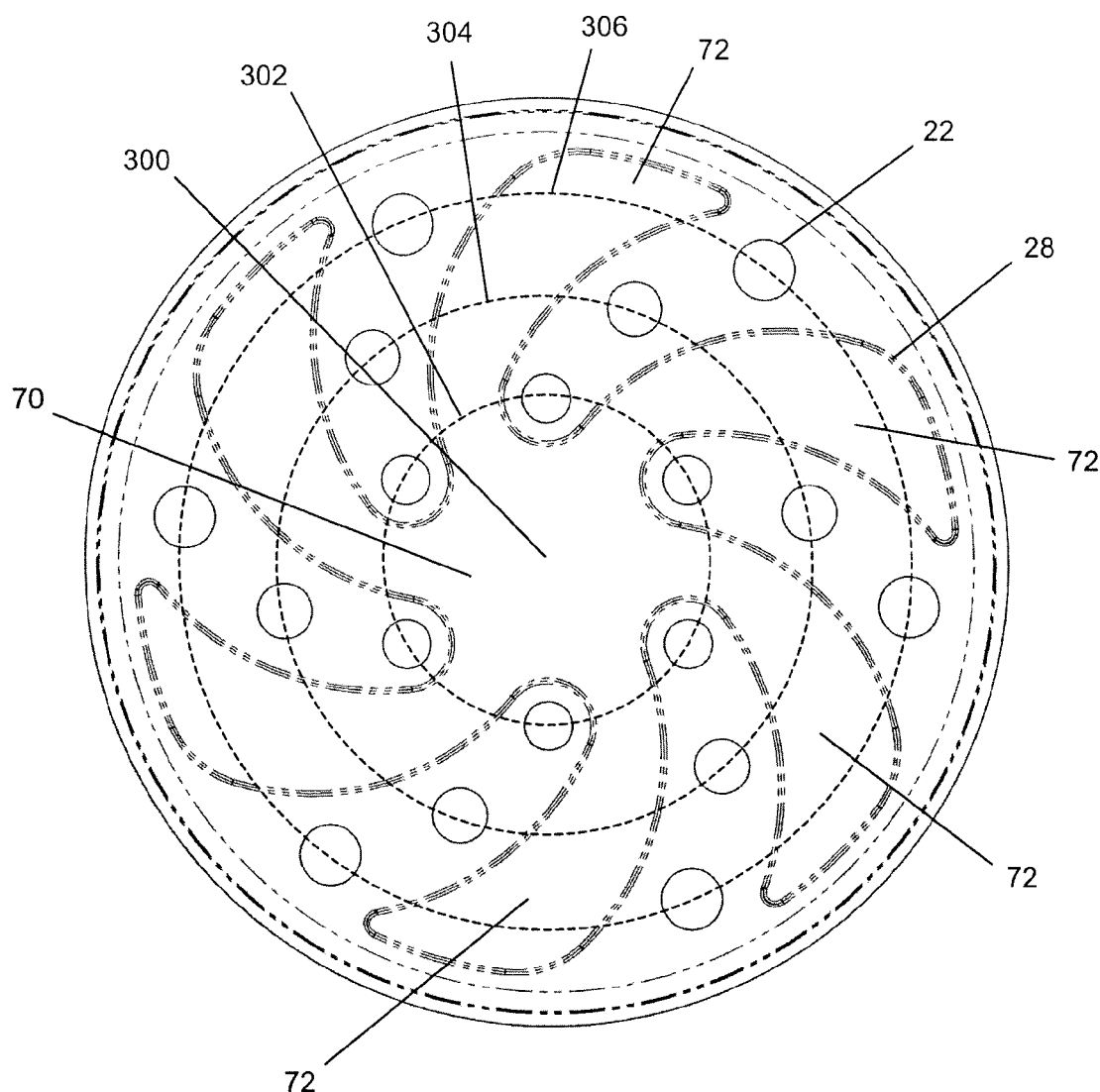
FIG. 7 is a plan view of the invention showing the combustion aperture 22 pattern and the choke emboss depression 28.
Figure 8:
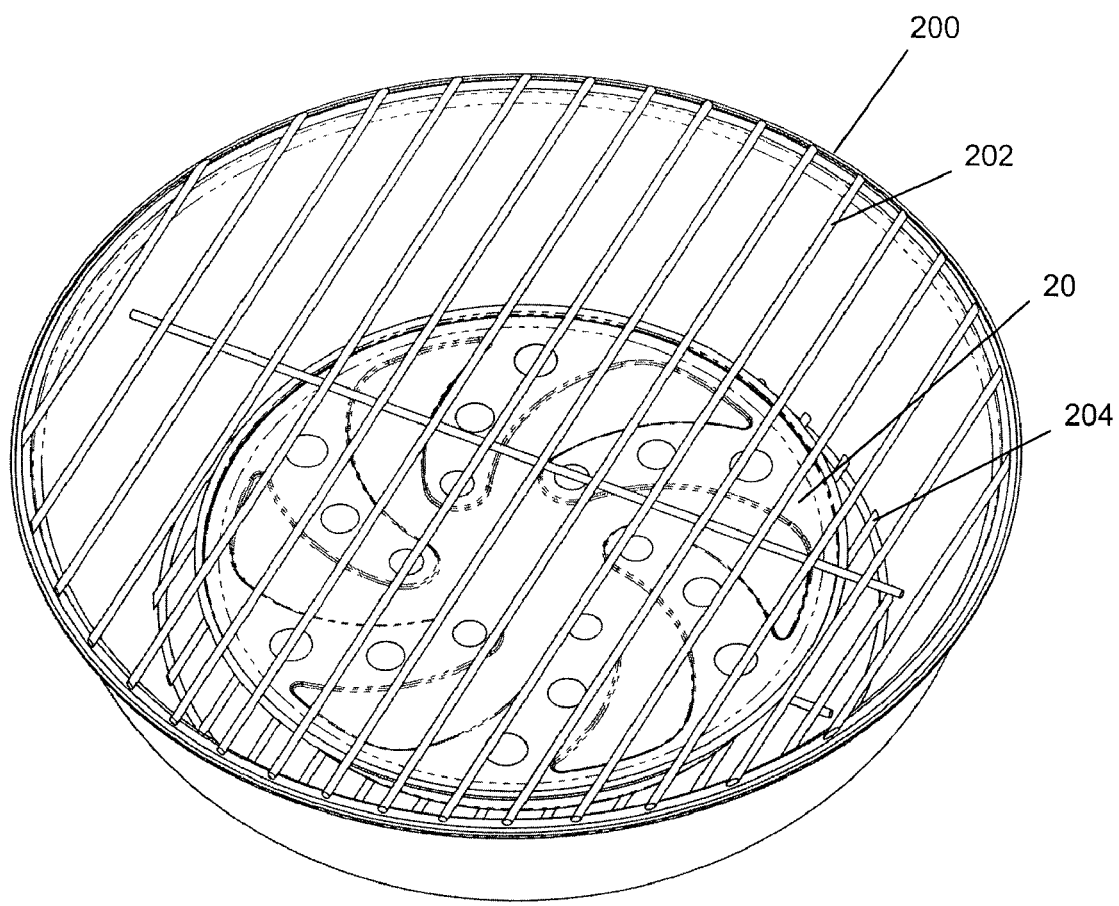
FIG. 8 is an isometric view of the invention being used inside of a common portable charcoal grill 200.
Figure 9:
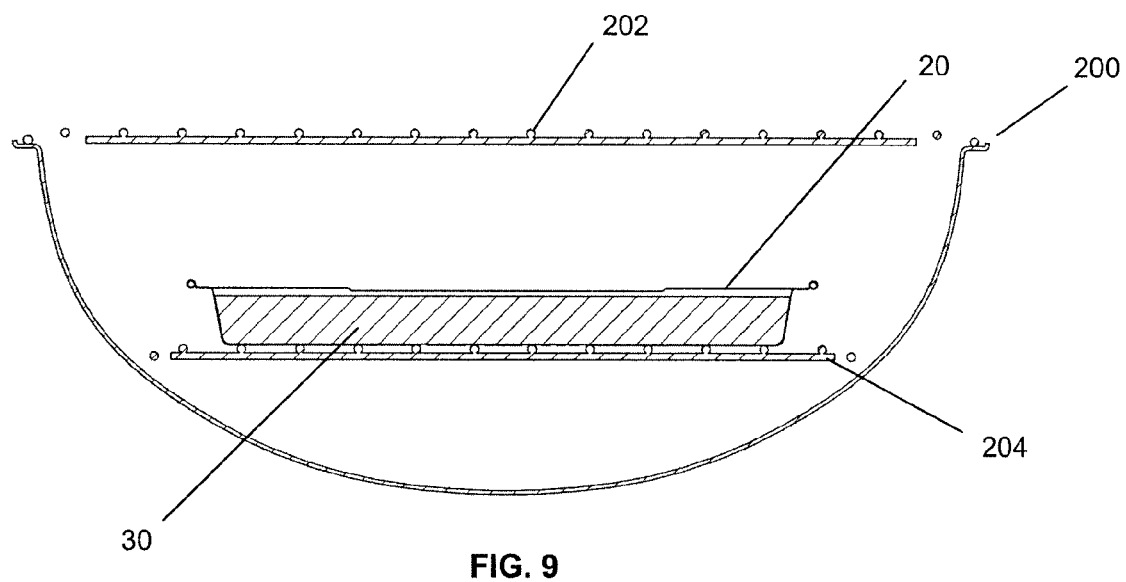
FIG. 9 is a cross-sectional side view of the invention being used inside of a grill 200.

The choke plate 20 can be made from any non-combustible material. In one embodiment the choke is made from 0.004 in. thick aluminum foil. The choke plate 20 has a top side 64, a bottom side 66, an outer edge 68, and a plurality of apertures 22. The choke plate 20 restricts the combustion of the fuel 30 down to a predetermined rate through varying the size, position and number of the apertures 22 present in the design. Generally speaking, the higher the cumulative exposed surface area of the fuel 30, the faster the combustion rate. The size and number of aperture 22 can be adjusted to provide the exposed surface area that is desired for the heating characteristics of the device. For direct cooking applications, suitably the combined plurality of apertures 22 provide a cumulative exposed surface area of the fuel (i.e. the cumulative combined area of the apertures) of greater than about 4-5 square inches, though different cumulative exposed surface areas can be used depending on the cooking characteristics desired. FIG. 7 describes one such choke aperture 22 pattern, but an infinite number of patterns are feasible. In the embodiment shown in FIG. 7 the plurality of apertures 22 are arranged in concentric rings around the center 300 of the choke plate. The plurality of apertures 22 comprise three separate concentric rings around the choke plate, consisting of an inner ring 302, a middle ring 304, and an outer ring 306. The diameter of the apertures in the inner ring 302 are smaller than the diameter of the apertures in the middle ring 304, and the diameter of the apertures in the middle ring 304 are smaller than the diameter of the apertures in the outer ring 306. In one embodiment, the apertures 22 of the inner ring 302 are ½" in diameter, the apertures 22 of the middle ring 304 are 9/16" in diameter and the apertures 22 of the outer ring 306 are ⅝" in diameter. This type of arrangement is pursued in one embodiment when one desires to bias the heat output of the device to the perimeter of the device to a achieve a grillable surface beyond the perimeter of the apertures and to counteract a natural tendency for the inner holes to burn faster (if they were equivalent surface area) due to the natural air currents that are established where air circulates in from the perimeter radialy and meets in the center. The choke plate 20 perimeter profile and combustion aperture 22 pattern can both be quickly fabricated in a singular step with a standard shear cutting press process that occurs simultaneous with its forming process.

A portion of the bottom side 66 of the choke plate 20 is supported by the vessel support ledge 48 on the vessel 40. See FIGS. 6A-C. The choke plate 20 also features a choke plate curl flange 24 that extends upward from the outer edge 68 of the choke plate 20. The choke plate 20 and the vessel 40 have matching curl flange regions (42 and 24), which are substantially vertical with a slight amount of draft to permit efficient nesting when stored in their sub-component state. When assembled the vessel curl flange 42 and the choke plate curl flange 24 are curled together securing the choke plate 20 to the vessel 40.

The choke plate 20 also features a depression section 28 which has a bottom 78 which is positioned lower than the bottom side 66 of the choke plate 20. The depression section 28 can be embossed into the choke plate 20. In one embodiment the depression section 28 has a center section 70 and a plurality of arm sections 72 which extend towards the outer edge 68 of the choke plate 20. In one embodiment no apertures 22 are located in the depression section 28. The depression section 28, among other purposes, adds aesthetic interest to the device for marketing appeal, strengthens the choke 20, and elevates the combustion apertures 22 slightly above the plane where grease drippings accumulate when grilling particularly greasy food, such as 80% lean ground beef (which helps to prevent excessive intermingling of the grease with the fuel 30).

The lidding film is suitably made from a thin film of paper or aluminum foil which has an adhesive or heat seal layer. Suitably the lidding film can be from 1-10 mm in thickness, though any suitable desired thickness can be used. The lidding film 10 has a top side 74 and a bottom side 76. The lidding film 10 provides a removable vapor barrier between the interior of the device and the environment, thus preserving the volatile fuel vapors from escaping. The lidding film 10 is suitably heat sealed to the choke plate 20 around the perimeter of the lidding film with an approximate 3/16" seal width, which creates a hermetic and impermeable package. The chosen heat sealant must exhibit enough adhesion to withstand common end-user abuse, transit and storage across a broad range of environments, but no so much that would make easy removal by the end-user difficult. Packaging solutions that involve hermetic and simultaneous "peel-away" characteristics are widely known and used in the packaging industry for food products. Alternatively, pressure sensitive adhesives can be used instead of heat sealing.

The lidding film 10 can feature a peel-away tab 12 that is folded 180 degrees back onto the top surface of the lidding film 10, which provides a convenient area for the user to grip the lidding and initiate the peel-away process upon use of the device. The lidding film 10 can also printed with marketing graphics, instructions and product-use warnings and therefore serves a communication function, in addition to its vapor barrier role.

Figure 10:
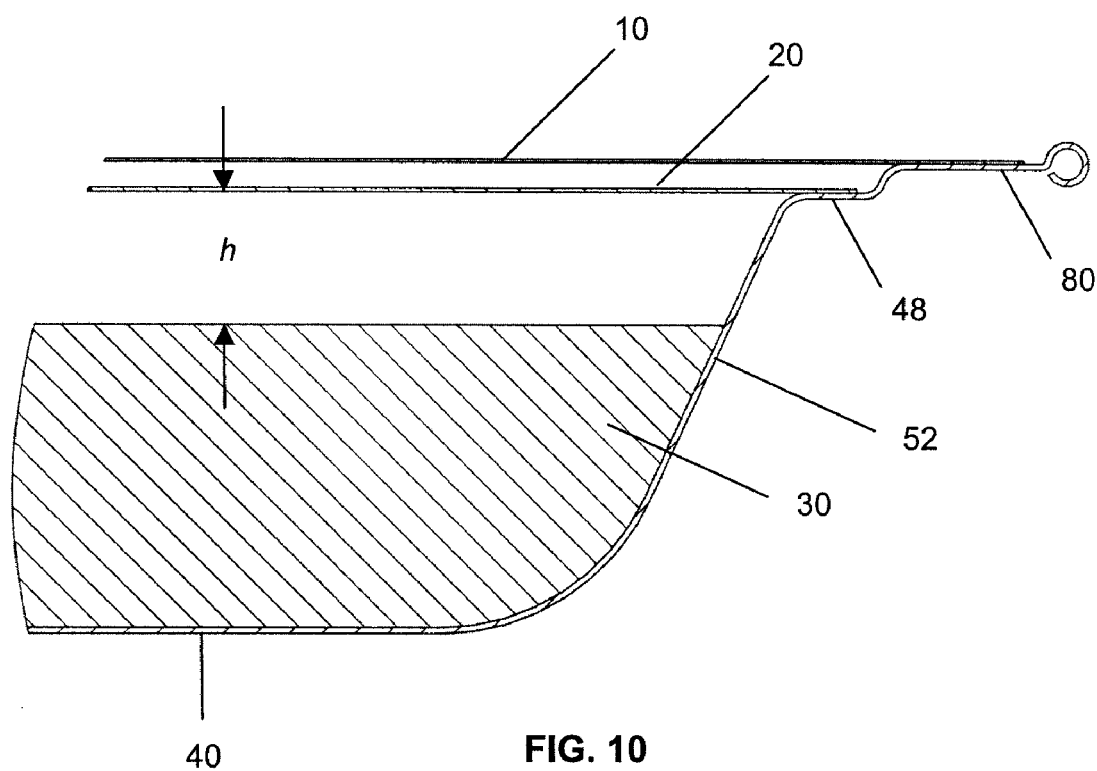
FIG. 10 is a cross-section of one embodiment of the assembled invention.

In another embodiment, shown in FIG. 10, the lidding film 10 is sealed directly to the vessel 40. In this embodiment, the vessel 40 has a sealing flange 80 that is sufficiently flat, smooth and free of residue to provide a suitable surface to heat-seal or otherwise bond the lidding film 10 to the vessel 40 hermetically. The sealing flange 80 is positioned on the side wall 52 of the vessel 40, above the choke support ledge 48. A hermetic seal between the lidding film 10 and the vessel 40 can be used to preserve the volatile alcohol-based fuel 30.

Figure 11:
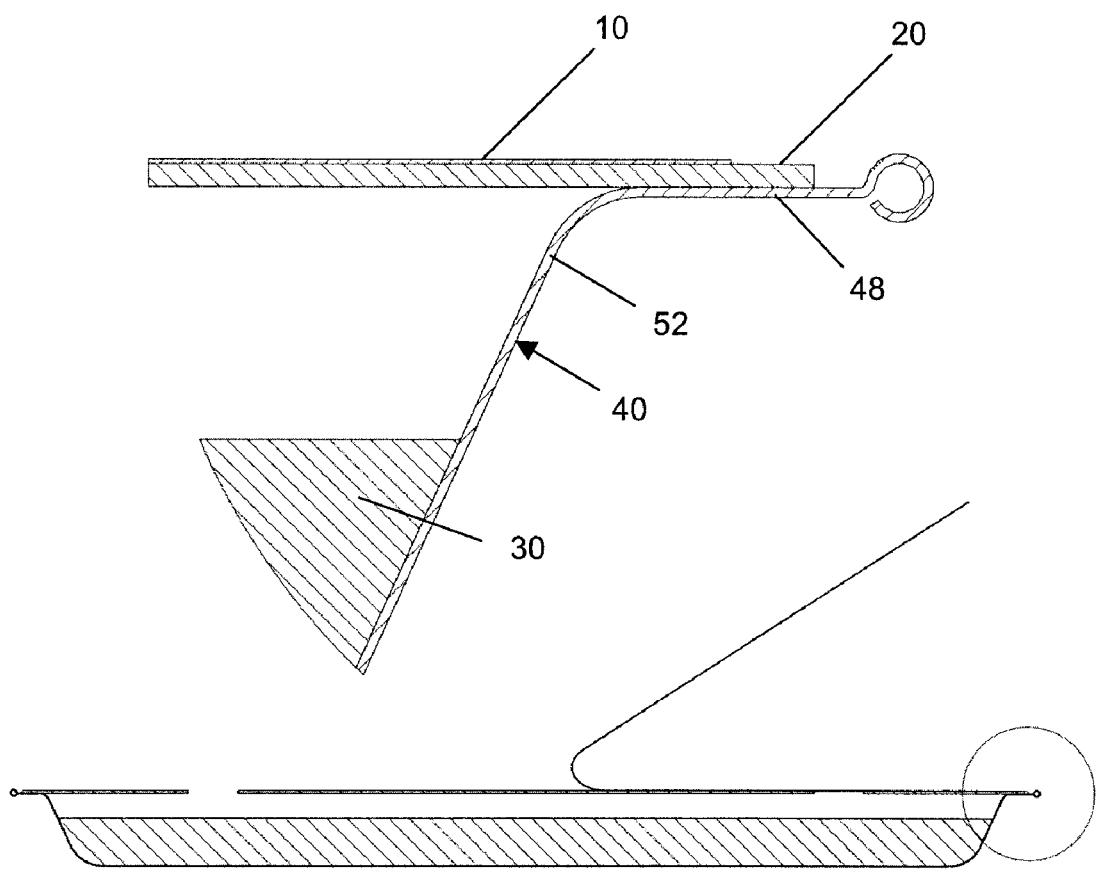
FIG. 11 is a cross-section showing another embodiment of the packaging configuration.
Figure 12:
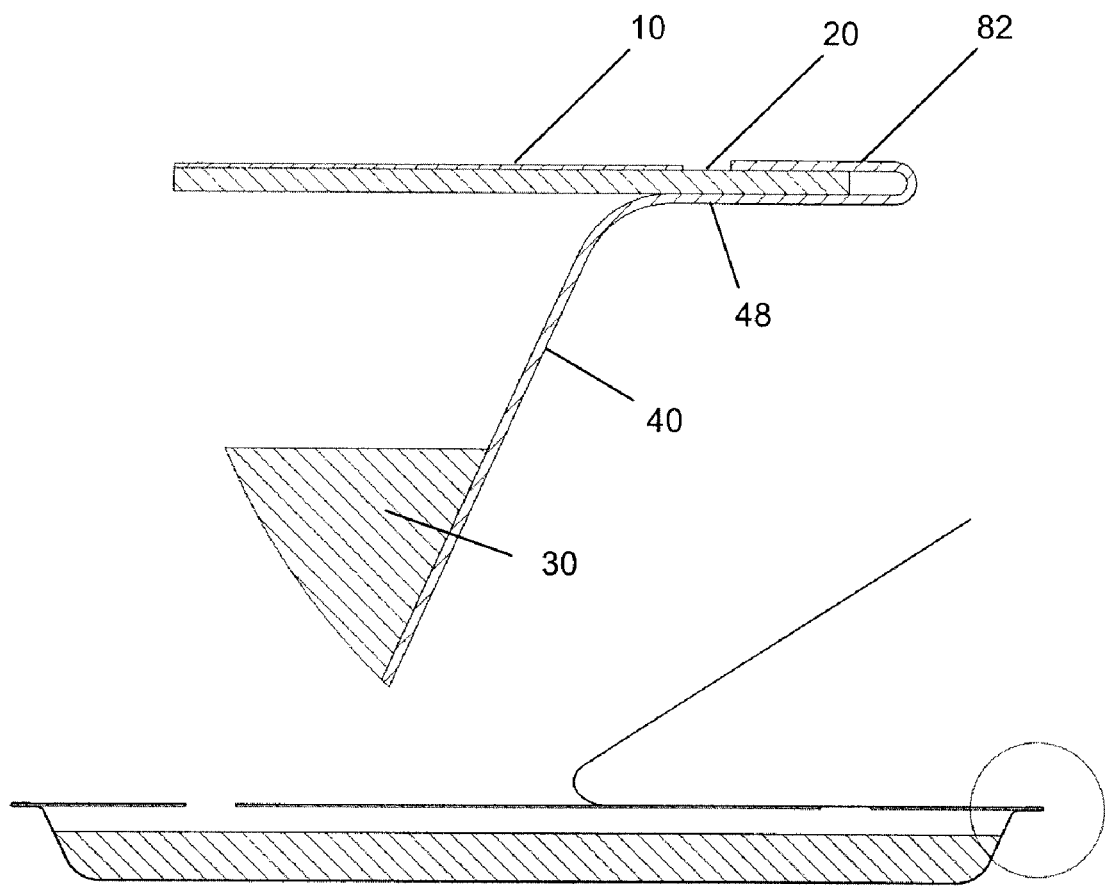
FIG. 12 is a cross-section showing another embodiment of the packaging configuration.

In another embodiment, the choke plate 20 is directly sealed to the choke plate support ledge 48 of the vessel 40. One of these embodiments is shown in FIG. 11. The choke plate 20 is directly sealed to the sealing flange 80 of the vessel 40. This provides the further benefit of maximizing the combustible surface area of the device without increasing the major dimensions of the vessel 40. A hermetic seal is used between both the choke plate 20/support ledge 48 interface, and the choke plate 20/lidding film 10 interface. The assembly sequence can be reordered for this embodiment, whereby the lidding film 10 can be pre-applied to the choke plate 20 in a subassembly. Filling the vessel 40 with fuel 30 can be performed first, and then secondarily the entire choke plate 20/lidding 10 film subassembly can be either heat-sealed or glued to the support ledge 48 of the vessel 40. Another embodiment where the choke plate 20 is sealed directly to the vessel 40 is shown in FIG. 12. In this embodiment the vessel 40 contains some added material around the perimeter of the side wall 52, a fold-over flange 82. The product is assembled in the same fashion mentioned above and the fold-over flange 82 is crimped over the top of the choke plate 20 to add mechanical integrity to the choke plate 20/vessel 40 interface. This embodiment is particularly conducive to a vessel 40 that may be manufactured with what is referred to as a "crinkle-wall" process. The added material of the fold-over flange 82 coupled with the use of an adhesive ensures the interface is hermetic. A "crinkle-wall" process is attractive economically because both upfront tooling expenses and variable part costs are significantly lower than corresponding "smooth-wall" processes.

Figure 13:
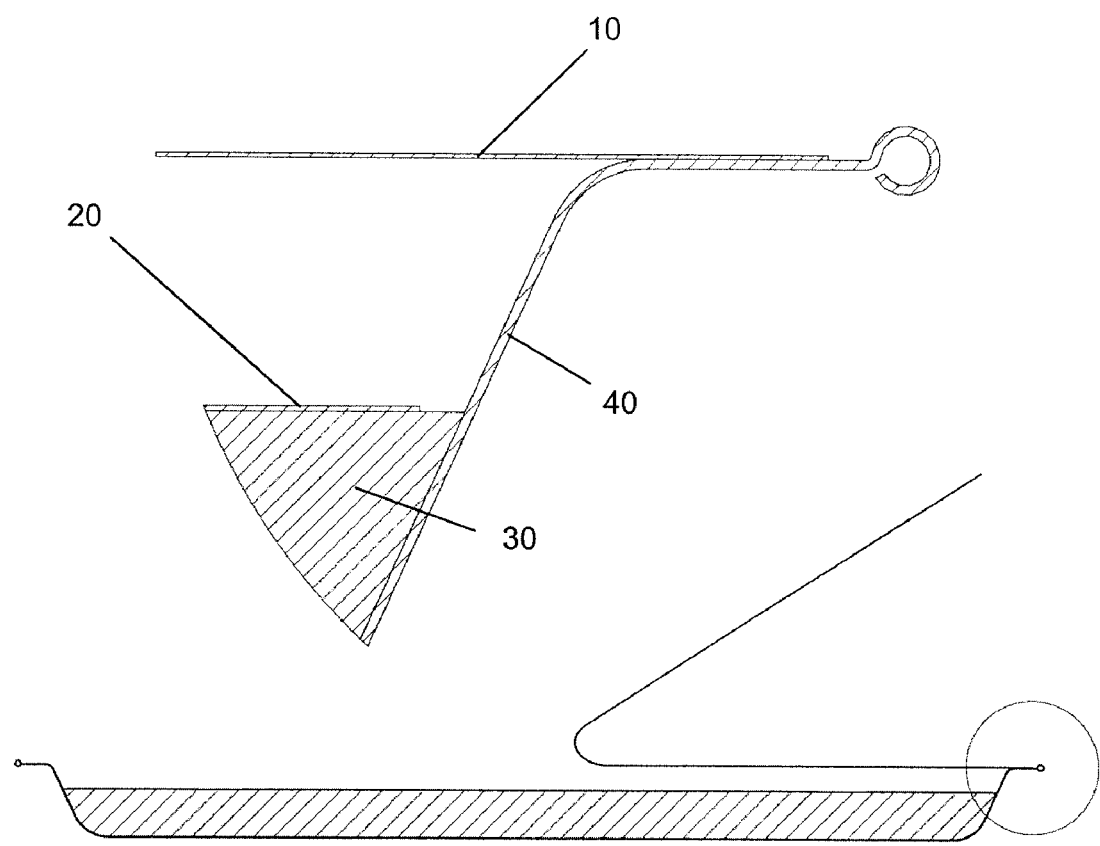
FIG. 13 is a cross-section showing another embodiment of the packaging configuration.

In another embodiment, the choke plate 20 is simply laid on top of the fuel 30. This embodiment is shown in FIG. 13. This approach preserves the geometric simplicity of the vessel 40, since no choke support ledge 48 is needed, and at the same time avoids the need for two hermetic seals in the design. In this embodiment the fuel 30 is dispensed into the vessel 40 first and then the choke plate 20 is installed secondarily.

Figure 14:
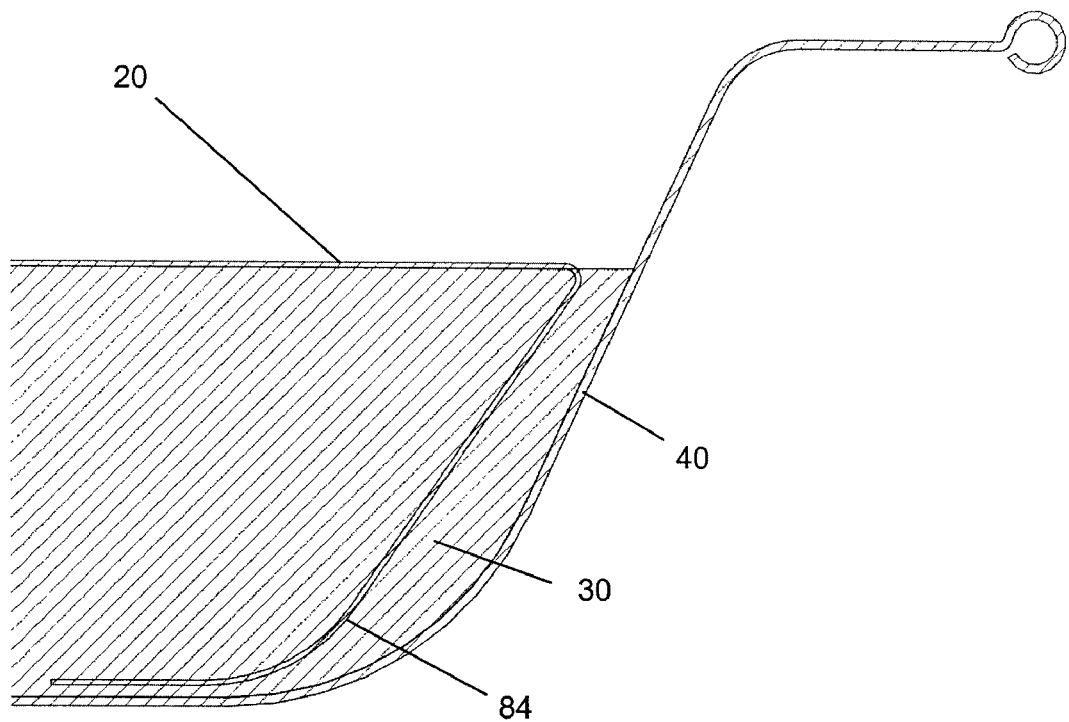
FIG. 14 is a cross-section showing another embodiment of the packaging configuration.

In yet another embodiment the choke plate is support by choke legs 84. This embodiment is shown in FIG. 14. These choke legs 84 can rest on the bottom 50 of the vessel, be directly attached or integral to the vessel, or can be embedded in the fuel 30. These choke legs can support the choke plate 20 while fuel is dispensed and mechanically secure the choke plate 20 within the fuel 30 after cooling/curing.

Suitably the diameter of the bottom 50 of the vessel 40 is greater than the height of the side wall 52 of the vessel 40. Suitably the diameter of the bottom 50 and the height of the side wall 52 has an aspect ratio of at least 8:1 (diameter of bottom of vessel:height if side wall). This aspect ratio has an impact on the burn characteristics of the device. Larger fuel surface areas lead to faster combustion rates because there is a larger surface to absorb thermal feedback and emit alcohol gas into the headspace region between the top surface of the fuel and the choke. This surface area can be adjusted along with other parameters to achieve the desired combustion rate.

In one embodiment, the present invention is assembled by placing the lidding film 10 onto the top surface 64 of the choke 20 plate within the cavity defined by the choke curl flange 24, ensuring the printed side faces upward and the sealant side faces downward. The two components are then placed inside heat sealing equipment and actuated. Typically heat is applied through the top surface 74 of the lidding film 10 at the perimeter in a continuous and uninterrupted fashion using an optimized combination of temperature, dwell time and pressure to achieve a seal with the appropriate characteristics. Once the two components are bonded together in this way, the resulting sub-assembly is referred to as the choke lidding subassembly 100.

Separately, the vessel 40 can be filled with fuel 30 using a shot metering system that dispenses a precise volumetric quantity, suitably 500 mL. The fuel 30 self-levels and solidifies, at which time the choke lidding subassembly 100 is installed by seating the choke plate 20 onto the vessel 40, so that the choke plate curl flange 24 mates with the vessel curl flange 42. The underside of the choke plate 20 is directly supported by the support ledge 48 on the vessel 40. The entire device is then put inside a curling machine that curls the vessel curl flange 42 and the choke plate curl flange 24 simultaneously together to form the curl 44. The curl 44 mechanically connects the choke 20 to the vessel 40, provides a hermetic interface and dramatically strengthens the device.

The headspace (dimension h) present in the design between the top surface of the fuel 30 and the choke plate 20 allows the device to be lit completely from a single combustion aperture. The headspace (dimension h) further allows the device to burn more robustly throughout the combustion duration; if one or more of the combustion apertures 22 goes out temporarily, it is quickly re-ignited by adjacent combustion of the other combustion apertures 22 via the air gap between the fuel 30 and the choke 20.

Upon use, the user pinches the peel-away tab 12 and peels away the lidding 10, exposing the choke plate 20 and exposed portions of fuel 30 that are visible through the combustion aperture 22 pattern. See FIG. 8. The device is placed in the bottom of a traditional grill 200 on the support grate 204, where charcoal is typically placed. The user then lights the product by igniting one of the combustion apertures 22 and then installs the cooking grate 202. Grilling can commence immediately. The grill lid may or may not be used, with little difference in performance or cook rate; however some smaller grills do not provide sufficient oxygen ventilation to sustain combustion and therefore this practice is generally not recommended. Using the device without a grill lid does not compromise the product's performance whatsoever because of the direct contact that occurs intermittently between the flames and the food. Periodic turning of the food to cook both sides equally speeds the cooking process and ensures uniform cooking.

At the conclusion of the grilling session, typically 45 minutes, the product fully consumes the fuel 30 and extinguishes. Within seconds, the device is cool-to-the-touch and can be safely removed and discarded. The present invention requires no intermediate tinder material (such as lighter fluid), heats instantly and cools down very rapidly. Due to its low level of residue and aluminum construction, the device can be recycled in a similar fashion as aluminum beverage cans.

While the present invention has now been described and exemplified with some specificity, those skilled in the art will appreciate the various modifications, including variations, additions, and omissions that may be made in what has been described. Accordingly, it is intended that these modifications also be encompassed by the present invention and that the scope of the present invention be limited solely by the broadest interpretation that lawfully can be accorded the appended claims.

The invention claimed is:

1. A grilling device comprising:
   a vessel having a bottom; a side wall extending up from the bottom, the side wall having a top; wherein the bottom and side wall of the vessel form an interior of the vessel;
   an alcohol fuel located in the interior of the vessel, wherein the alcohol fuel is solidified and consists of a mixture of ethanol, water and sodium stearate;
   a choke plate having top side, a bottom side, a plurality of apertures;
   wherein the choke plate is secured to the vessel; and
   wherein the bottom of the vessel has a diameter and the side wall of the vessel has a height; and wherein the diameter of the bottom of the vessel and the height of the side wall have an aspect ratio of at least 8:1.

2. The grilling device of claim 1 further comprising a lidding film having a top side, a bottom side, wherein a portion of the bottom side of the lidding film is sealed to the top side of the choke plate.

3. The grilling device of claim 1 wherein the vessel further has a support ledge having an outer edge, the support ledge extending from the top of the side wall; and wherein a portion of the bottom side of the choke plate rests on the support ledge of the vessel.

4. The grilling device of claim 3 wherein the vessel further has a vessel curl flange extending upward from the outer edge of the support ledge;
   wherein the choke plate further has an outer edge and a choke plate curl flange which extends upward from the outer edge of the choke plate; and
   wherein the vessel curl flange and the choke plate curl flange are curled together securing the choke plate to the vessel.

5. The grilling device of claim 1 wherein the choke plate has a center and the plurality of apertures in the choke plate are arranged in concentric rings around the center of the choke plate.

6. The grilling device of claim 5 wherein each aperture has a diameter and wherein the plurality of apertures are arranged in three separate concentric rings around the center of the choke plate, the three concentric rings comprising an inner ring, a middle ring, and an outer ring; wherein the diameter of the apertures in the inner ring are smaller than the diameter of the apertures in the middle ring, and the diameter of the apertures in the middle ring are smaller than the diameter of the apertures in the outer ring.

7. The grilling device of claim 1 wherein the ethanol in the fuel is present in an amount of at least 55% w/v of the mixture; water is present in an amount of 0-40% w/v of the mixture; and sodium stearate is present in an amount of 2-20% w/v of the mixture.

8. The grilling device of claim 7 wherein the ethanol in the fuel is present in an amount of 80-95% w/v of the mixture; water is present in an amount of 3-4% w/v of the mixture; and sodium stearate is present in an amount of 2-10% w/v of the mixture.

9. A grilling device comprising:
   a vessel having a bottom; a side wall extending up from the bottom, the side wall having a top; wherein the bottom and side wall of the vessel form an interior of the vessel;
   an alcohol fuel located in the interior of the vessel, wherein the alcohol fuel is solidified and consists of a mixture of ethanol, water and sodium stearate;
   a choke plate having a top side, a bottom side, an outer edge, a plurality of apertures, wherein the choke plate is secured to the vessel;
   wherein the choke plate has a center and the plurality of apertures in the choke plate are arranged in concentric rings around the center of the choke plate; and
   wherein each aperture has a diameter and wherein the plurality of apertures are arranged in three separate concentric rings around the center of the choke plate, the three concentric rings comprising an inner ring, a middle ring, and an outer ring; wherein the diameter of the apertures in the inner ring are smaller than the diameter of the apertures in the middle ring, and the diameter of the apertures in the middle ring are smaller than the diameter of the apertures in the outer ring.

10. The grilling device of claim 9 wherein the ethanol in the fuel is present in an amount of at least 55% w/v of the mixture; water is present in an amount of 0-40% w/v of the mixture; and sodium stearate is present in an amount of 2-20% w/v of the mixture.

11. The grilling device of claim 10 wherein the ethanol in the fuel is present in an amount of 80-95% w/v of the mixture; water is present in an amount of 3-4% w/v of the mixture; and sodium stearate is present in an amount of 2-10% w/v of the mixture.

12. A grilling device comprising:
a vessel having a bottom; a side wall extending up from the bottom, the side wall having a top; wherein the bottom and side wall of the vessel form an interior of the vessel;
a fuel located in the interior of the vessel;
a choke plate having a top side, a bottom side, an outer edge, a plurality of apertures, and a depression section which has a depression section bottom which is positioned lower than the bottom side of the choke plate; wherein the choke plate is secured to the vessel;
wherein the choke plate has a center and the plurality of apertures in the choke plate are arranged in concentric rings around the center of the choke plate; and
wherein each aperture has a diameter and wherein the plurality of apertures are arranged in three separate concentric rings around the center of the choke plate, the three concentric rings comprising an inner ring, a middle ring, and an outer ring; wherein the diameter of the apertures in the inner ring are smaller than the diameter of the apertures in the middle ring, and the diameter of the apertures in the middle ring are smaller than the diameter of the apertures in the outer ring.

13. The grilling device of claim 12 wherein the vessel further has a support ledge having an outer edge, the support ledge extending from the top of the side wall; and wherein a portion of the bottom side of the choke plate rests on the support ledge of the vessel.

14. The grilling device of claim 13 wherein the vessel further has a vessel curl flange extending upward from the outer edge of the support ledge;
wherein the choke plate further has a choke plate curl flange which extends upward from the outer edge of the choke plate; and
wherein the vessel curl flange and the choke plate curl flange are curled together securing the choke plate to the vessel.

15. The grilling device of claim 12 wherein the have a cumulative combined area of 4-5 square inches.

16. The grilling device of claim 12 wherein the bottom of the vessel has a diameter and the side wall of the vessel has a height; and wherein the diameter of the bottom of the vessel and the height of the side wall have an aspect ratio of at least 8:1.

* * * * *